United States Patent
Adrian et al.

(10) Patent No.: US 6,972,374 B2
(45) Date of Patent: Dec. 6, 2005

(54) FLEXIBLE CONDUCTOR CODE FOR SUPERCONDUCTING POWER CABLE AND MANUFACTURING PROCESS THEREOF

(75) Inventors: Gonzalez Parada Adrian, Queretaro (MX); Nieto Sanchez Jose Luis, Queretaro (MX); Perez Sanchez Alfonso, Queretaro (MX)

(73) Assignee: Servicios Condumex S.A. DE C.V., Queretaro (MX)

( * ) Notice: Subject to any disclaimer, the term of this patent is extended or adjusted under 35 U.S.C. 154(b) by 52 days.

(21) Appl. No.: 10/083,485

(22) Filed: Feb. 27, 2002

(65) Prior Publication Data

US 2003/0159847 A1 Aug. 28, 2003

(51) Int. Cl.$^7$ ................................. H01B 12/00

(52) U.S. Cl. ............................... 174/106 R; 174/125.1; 505/886

(58) Field of Search ......................... 174/106 R, 125.1; 505/230, 231, 886, 887

Primary Examiner—Chau N. Nguyen
(74) Attorney, Agent, or Firm—Jonathan E. Grant

(57) ABSTRACT

A flexible conductor core for superconducting power cable, characterized by a central tubular element on which the superconducting tapes are placed, in the shape of a spiral or helix, in at least two layers with a calculated angle of lay length, being one of the sections of the layers of the superconducting tapes laid in a direction opposite to the other section, wherein the laying length of all the layers varies from a maximum $P_{max1}$ (1000 cm) and $P_{max2}$ (1000 cm) in the intermediate layers to a $P_{min1}$ (2 cm) and $P_{min2}$ (2 cm) in the external layers, while the laying angle of the tapes of all the layers varies from $\alpha_{max1}$ (45°) to $\alpha_{min1}$ (0°)

7 Claims, 3 Drawing Sheets

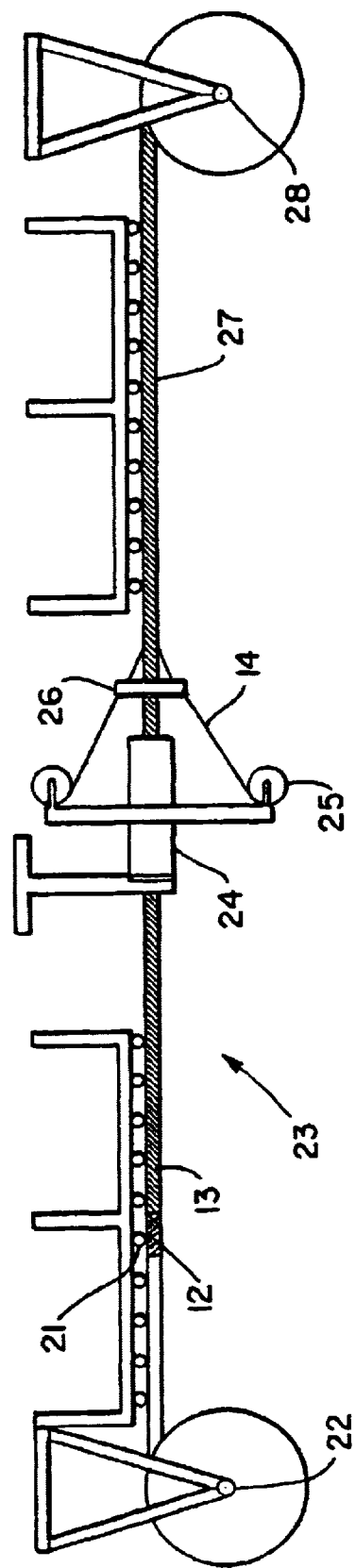

FLEXIBLE CONDUCTOR CODE FOR SUPERCONDUCTING POWER CABLE AND MANUFACTURING PROCESS THEREOF

BACKGROUND OF THE INVENTION

1. Field of the Invention

This invention relates to electrical power conduction and especially to the manufacturing of a central core used in the manufacturing of superconducting cables. On the external surface area of the core, several superconducting tapes are placed permitting a spiral conformation with a predetermined angle and lay.

2. Description of the Previous Art

The design of AC power cables with electric conductors that can contain superconducting compounds of metal oxides that have high transition temperatures ($T_c$), preferably above 77° K and that can be cooled by liquid nitrogen under normal pressure is known. Said materials are called high temperature superconducting materials (HTS).

Some of the most commonly used HTS superconducting materials are the materials made of ceramic compounds or metal oxides such as Y—Ba—Cu—O, Bi—Sr—Ca—Cu—O or Pb—Sr—Ca—Cu—O in different compositions, all them with $T_c$ above 100° K. The superconducting tapes are made of ceramic elements that are fragile materials and $T_c$ value drops when they are under stress or bent.

The high temperature superconductors can be important aspects of technological advances and can be integrated as components of equipment or devices. An obvious application is the use of zero resistance properties, in a superconducting state, to the passage of direct current and low power losses in the transmission of electric energy. In present transmission lines, electric energy is lost through heat when current passes through normal conductors. If electric energy is transmitted through superconducting cables, the losses can be eliminated with the subsequent savings in energy costs. This can be applied to any electric components having copper conductors, such as motors, transformers, generators and any equipment involved with electric energy.

Another practical application of these materials is in the field of electronics, taking advantage of the breaker effect of the Josephson junction, which can be used as an element in computers. The magnetic levitation phenomenon in superconductors can be exploited in transportation, for example in the case of the prototype of the train on superconducting rails developed in Japan. Moreover, an important application is in medicine, as a diagnostic tool, where superconducting magnets are used in magnetic resonance equipment (MRI).

Tests conducted on low temperature superconducting cables have shown a lack of technical restrictions for the design of cryogenic cables, and bringing HTS superconducting materials at operating temperatures is relatively simple using liquid nitrogen, which reduces the operating costs related to this type of cables.

Currently, HTS materials have some restrictions because of their critical characteristics ($T_c$ $H_c$ $I_c$). Presently, [researches have been] research has focused on increasing the superconducting section to improve current conduction capacity, with a larger number of layers, from 4 to 6 in the case of Germany and the USA, 8 in Denmark, and up to 10 layers in Japan.

The direction of the sense of each tape layer alternates with each layer, with a diameter between conductors ranging from 3.0 cm to 4.0 cm. The superconducting tapes are applied with a lay length (L) from 50 cm to 100cm (FIG. 4) in order to observe the behavior of the cable critical characteristics. In tests conducted on short segments of cables, independently of the design parameters (diameter and lay length), the current distribution between layers is relatively uniform, the superconducting section is totally used and the maximum values of critical current are obtained in the tests. Values of 5800 A–12000 A have been reached in short segments of cable.

Some US and Japanese companies have manufactured and tested superconducting cable models up to 500 cm long, obtaining current values not above 1700 A to 2000 A. Tests conducted on 500 cm segments have revealed problems of current distribution between layers because said distribution tends to be irregular due to electrodynamic problems related to the conductor per se. Particularly, the current conduction capacity of the core is determined by equidistant section of the current flow, because the time constant of the electromagnetic field diffusion in the axial direction tends to be much larger than the time constant of the electromagnetic field diffusion in the radial direction. Moreover, in Patent WO 00/39813, a superconducting cable is described using high temperature superconducting materials HTS with a flexible core. This relates, however, to a traditional coaxial design with insulated HTS tape layers and in cold. Japanese Patent 06239937 A2 describes a superconducting cable with HTS materials and flexible core but involves a traditional design for DC (direct current) and insulation between each layer of HTS tape.

In U.S. Pat. No. 5,529,385 a superconducting cable similar to the object of the instant invention is described, but only with regard to the type of materials used. In U.S. Pat. No. 5,952,614 a superconducting cable similar with regard to the use of HTS materials and flexible core is described, but with a coaxial design, in cold, and traditional design of HTS tapes.

Although the inventions cited above coincide in some already mentioned aspects with the instant invention, they generally focus on other construction characteristics, such as mechanical aspects, tape degradation and electric losses.

DESCRIPTION OF THE INVENTION

Hereinafter the invention will be described with reference to the drawings of FIGS. 1 to 4, wherein:

FIG. 3 is a perspective view of a tape-winding machine to manufacture the core of FIG. 1.

FIG. 4 is a side view of FIG. 1 showing the length of the lay "L" on a segment of flexible conductor core.

Figure 1:
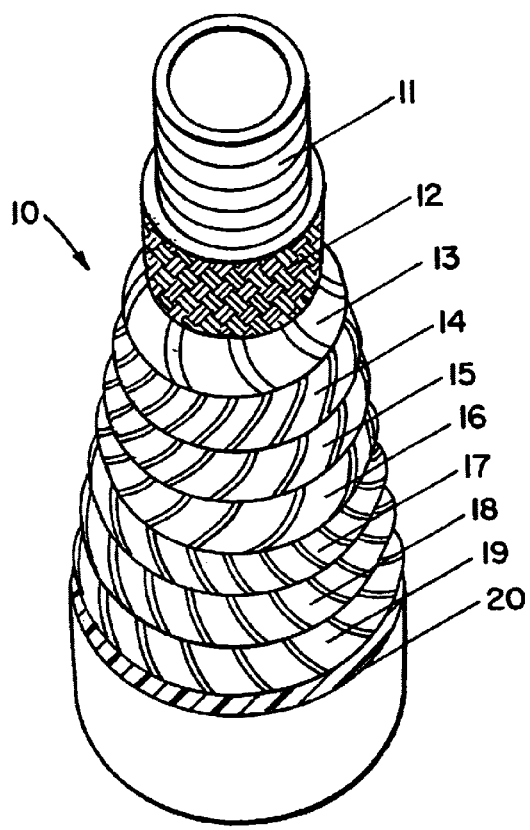
FIG. 1 is a cross-sectional perspective view of a conductor core for superconducting power cable.

The superconducting core object of the instant invention is manufactured through the following steps:

placing a corrugated support tubular element 11 (FIG. 1) (known as "former") on a bed of rolls of a tape-winding machine;

placing a stainless steel tape layer 12;

coating with a copper tape layer 13;

placing the superconducting element tapes 14, 15, 16, 17, 18 and 19 either in one sense or in the opposite sense and coating with a final unifying layer 20.

According to the manufacturing process of the superconducting core, the tapes are submitted to a strain caused by the bends produced in the tape-winding machine and the central core when the layer is manufactured. This relative strain is determined through the following equation:

$$\epsilon = \delta \operatorname{sen} \alpha \, D_f \quad (1)$$

where:
- $\delta$=thickness of the superconducting tape
- $D_f$=diameter of the central core (former)
- $\alpha$=placing angle of the tape on the central core.

Another type of strain appears when the cable is placed on storage reels or on a curved installation site. The strain occurring in this case is determined through the following equation:

$$\epsilon = \pi\lambda \cos \alpha/p + p \operatorname{sen} \alpha/\pi D_b$$

where:
- p=lay length of the tape on the core
- $D_b$=bend diameter on a reel or duct.

From the abovementioned equations, it is obvious that a maximum angle (minimum lay length) is determined by the equation number 1 and a minimum angle (maximum lay length of the tapes on the cable core) is determined by equation number 2, being $$\epsilon = [\epsilon] = 0.002 - 0.003.$$

Currently, it is difficult to obtain a uniform distribution of current between layers without developing special designs. The analysis of traditionally shaped conductors having two, three or four superconducting tape layers shows that, in superconducting state, when the voltage drop throughout the conductor is not determined or measured, the current flows only in the first two external layers and is practically nil in the internal layers of the cable. The results show that the variation in the direction of the laying length has no important effect on current distribution.

Figure 2:
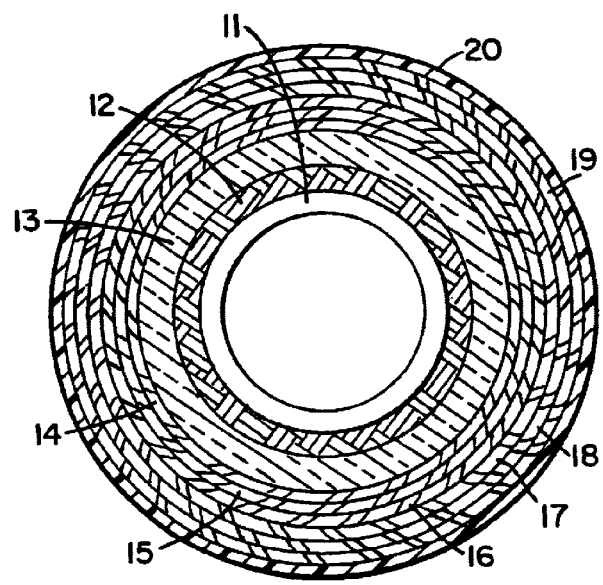
FIG. 2 is a cross-sectional view of FIG. 1.

To improve the above mentioned drawbacks, the applicant has developed a new design which consists of at least a cable with a central core (former) around which superconducting tapes are spirally placed, on at least two layers with a laying angle defined by the characteristic that some of the layers adjacent to the core are twisted in a sense and the other, peripheral part of the layers is twisted to the opposite side. Twist pitches of the layers vary from maximum $P_{max1}$ and $P_{max2}$ in medium layers to minimum $P_{min1}$ and $P_{min2}$ in inner and outer layers, while twist angles of the tapes in the layers vary from $\alpha_{max1}$ to $\alpha_{min1}$ and from $\alpha_{max2}$ to $\alpha_{min2}$ and at least one layer of tapes from normally conducting metal is located between the outer surface of the former and the inner surface of the layer, where for inner layers:

$P_{min1}$ and $\alpha_{max1}$—minimum pitch and maximum twist angle of tapes in the first layer made of superconducting tapes from the cable axis:

$P_{max1}$ and $\alpha_{min1}$—maximum pitch and minimum twist angle of tapes in the layer from the cable axis layer made of superconducting tapes of the part of layers adjacent to the central core and having one direction of lay;

for outer layers:

$P_{min2}$ and $\alpha_{max2}$—minimum pitch and maximum twist angle of tapes in the first layer are made of superconducting tapes from the cable axis; $P_{max2}$ and $\alpha_{min2}$—maximum pitch and minimum twist angle of tapes in the layer from the cable axis layer made of superconducting tapes of the second part of layers with opposite direction of lay, In this case, the superconducting core is designed to operate in alternate current, direct current and current pulses, using a layer of tapes made of low electric conductivity metals or alloys (Cu, Al, Ag). Said layers of superconducting tapes (one or more layers), and the laying direction of the tapes in the internal layers to the external layers changes only once independently of the number of layers. Thus, the number of times the layers of superconductor tapes change the laying sense in the opposite direction presents a 1:1 to 1:2 ratio. It must also be taken into account that superconducting elements can be used in the layers in any shape, round, oval or in shape of a sector. The conducting core of the superconducting cable 10 of FIGS. 1 and 2 is a cylinder-type conducting element consisting of several concentric sections longitudinally placed, having in its center a helical externally corrugated flexible tubular element 11 made of 304 or 316 stainless steel, which can have an external diameter ranging from 4 cm to 6 cm and an internal diameter ranging from 2 cm to 4 cm, with a corrugation depth varying from 0.5 cm to 1 cm. The corrugation pitch can be between 0.8 and 1.5 cm for a corrugation depth between 0.4 and 0.5 cm. In another embodiment, for depth between 0.4 and 0.6 cm, the corrugation pitch can be between 1.6 and 3 cm, above which a 304 or $316^a$ stainless steel mesh is placed in order to offer a relatively flat surface for the next application. Said mesh consists of a first layer of stainless steel tapes 12, having a width between 4 and 5 cm and a thickness between 0.005 and 0.006 cm, a corrugated tube is placed with a spacing between 0.15 and 0.2 cm. Then one or two additional layers of stainless steel tapes are placed, from 2.5 to 4 cm wide and from 0.001 to 0.002 cm thick with a spacing between tapes ranging from 0.1 to 0.15 cm; then a first layer of Cu tapes, 13, is placed, between 0.25–0.40 cm wide and 0.025–0.030 cm thick, which is applied with a laying length ranging from 2 cm to 100 cm depending on the cable design and the first layer of superconducting tape is to be applied with an application angle ranging from 0° to 45°, being the core characterized by the geometrical placing of a superconducting material which is a commercial product based on BISSCO tapes in the 22233 composition. Said tapes are between 0.38 and 0.42 cm wide and between 0.018 and 0.022 cm thick presenting a superconducting material section 0.018 thick and 0.35 cm wide, giving a current density of 7 kA/cm² under the criteria of 0.1 $\mu$V/cm, with a superconducting material applied in three concentric layers 14, 15, and 16 of superconducting material tapes with a 2 cm to 300 cm long lay length, and with a 0° to 45° angle depending on the design required for each layer and with a direction that can be right or left. Then three other layers of superconducting material tapes 17, 18, and 19 are applied with a lay length ranging from 2 cm to 300 cm, with a 0° to 45° angle depending on the design of each layer and with a laying direction that can be right or left in the direction opposite to the layers previously placed 14, 15 and 16. Finally a reunifying tape made of an insulating material 20, commercial product that can be Mylar or Kapton, with a thickness ranging from 0.005 to 0.01 cm, and a width ranging from 2 to 4 cm. is applied.

Figure 5:
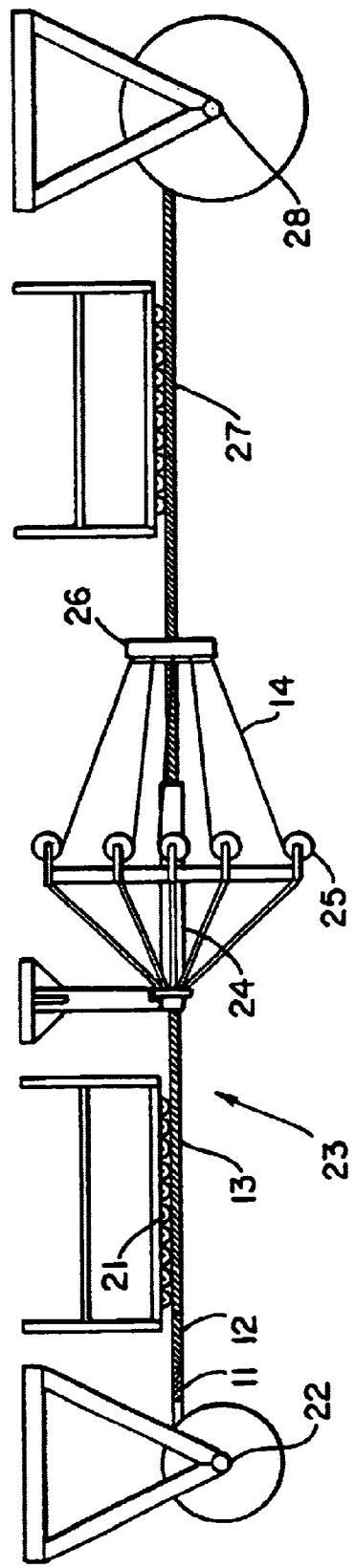
FIG. 5 is a more detailed perspective view of FIG. 3.
Figure 6:
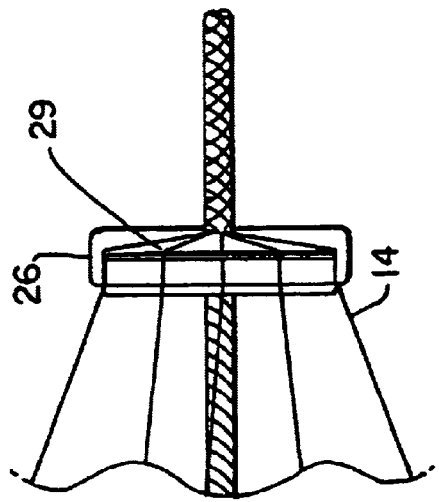
FIG. 6 is a perspective view of the header of FIG. 5.

According to FIG. 3 the manufacturing process of the superconducting core, FIG. 1, 10 is conducted in a tape-winding machine designed for this purpose and consists of the following steps:

Placing the stainless steel corrugated central core (former) 11, on a bed of rolls 21, FIG. 3, and then placing a layer of stainless steel tape to give uniformity to the surface 12, FIGS. 1 and 2; after coating, a layer of Cu tapes 13, FIG. 1, is placed as initial layer. The tape-winding machine 23 is a table or bench structure placed longitudinally and presenting the following mechanical arrangements: an initial unwinding element 22 placed at the front end of the machine on which the core is placed for the application of the superconducting tapes, then an elongated bed of rolls 21 to avoid its flexion, then, a header element 24 projects adjacently and longitudinally, where the superconductor tapes are placed on reels 25, FIG. 5, located at the sides of the header to accommodate the superconducting tapes individually. Having a diameter ranging from 20 and 25 cm, said reels supply the superconducting tape with a mechanical stress between 0.5 Kg and 6 Kg, without causing mechanical damage or losses of electric properties to the superconducting tapes. The number of reels can vary form 18 to 72, depending on the number of tapes to be used for the manufacturing of each layer of cable. The superconducting tape passes through a second header 26 before being applied onto the cable core. Said header includes 18 to 72 guide elements 29, FIG. 6, for the tape, depending on the number of tapes to be applied on the core and the application angle of the tapes can vary from 0° to 45° with a curve radius between 0 to 6 cm, depending on the angle and laying of the superconducting tape on the cable. With said machine it is possible to obtain laying angles from 1° to 60° with cabling lays from 2 cm to 300 cm. After this arrangement, a second bed of rolls 27, FIGS. 3 and 5, is placed longitudinally to support the superconducting core with the tapes and in the extreme part of the rear end there is a winding element 28 to receive the superconducting core with the tapes applied on it. After this initial layer, several superconducting material tapes are placed. Depending on the design and number of layers, said layers will be placed in one direction or in the opposite sense. Said procedure repeats itself as many times as the number of superconducting tape layers required by the design of the cable.

The following examples describe the results obtained and the comparative results in order to illustrate the invention without limiting its scope.

EXAMPLE NO. 1

A 1 m superconducting core segment was manufactured according to the characteristics shown on Table 1. This model of superconducting core includes only 4 layers in order to test the theoretical models.

TABLE 1

|  | Layer number 1 | Layer number 2 | Layer number 3 | Layer number 4 |
|---|---|---|---|---|
| Superconducting material |  |  |  |  |
| Tape thickness (cm) | 0.022 | 0.028 | 0.028 | 0.022 |
| Width (cm) | 2.98 | 2.99 | 3.23 | 3.24 |
| Crit. electric current (A) 1 $\mu$V/cm | 42.2 | 39.6 | 40.5 | 39.3 |
| Space between tapes (cm) | 0.0057 | 0.0055 | 0.0044 | 0.0084 |
| Cable construction |  |  |  |  |
| Laying direction | Left | Left | Right | Right |
| Laying angle | 25.54 | 13.24 | 11.08 | 35.8 |
| Laying length (cm) | 33.6 | 69.0 | 84.0 | 23.12 |
| Number of tapes | 46 | 50 | 49 | 6.40 |
| Length of tape (cm) | 2.55 | 2.58 | 2.61 | 2.65 |

TABLE 1-continued

|  | Layer number 1 | Layer number 2 | Layer number 3 | Layer number 4 |
|---|---|---|---|---|
| Current parameters |  |  |  |  |
| Relative current in each layer $i_1 = I_1/I_0$ | 10000 | 0.9981 | 0.9918 | 0.9467 |
| Current density $J_1 = I_1/I_0$ | 0.2451 | 0.2669 | 0.2712 | 0.2167 |

It can be observed that the current parameters show that the percentage of tape utilization is within 99% ($I_1/I_0$). This corresponds to a total current value in the cable $I_0$=4,500 A, according to the current distribution in each layer.

EXAMPLE NO. 2

The traditional model was analyzed as is shown on Table No. 2 and the general parameters of the superconducting core were determined, using the superconducting materials as in example No. 1, in which the main characteristics of the superconducting core are:

TABLE 2

|  | Layer number 1 | Layer number 2 | Layer number 3 | Layer number 4 |
|---|---|---|---|---|
| Cable construction |  |  |  |  |
| Laying direction | Left | Right | Left | Right |
| Layer radius (cm) | 2.0 | 2.05 | 2.10 | 2.15 |
| Current parameters |  |  |  |  |
| Relative current in each layer $i_1 = I_1/I_0$ | 0.2000 | −0.3007 | 0.5716 | 0.5282 |
| Current density $J_1 = I_1/I_0$ | 0.4522 | −0.5373 | 0.9971 | 1.0000 |
| Maximum current $I_{max}$ (A) |  | 1,373.3 |  |  |

According to the previously mentioned parameters, a total maximum current of 1,373 A is obtained. From this it is obvious that for classical or traditional designs of superconductor core, for power cable application, alternating the laying direction in each layer does not result in a uniform current distribution ($J_i$) in each layer. The major current circulation concentrates in the external layers of the cable, the internal layers working at a much lower capacity than the external layers.

The embodiments described above are not intended to be limiting to the scope of the claims and equivalents thereof.

What is claimed is:

1. A flexible superconducting core for a superconducting power cable, said core comprising:
   a) a helical central corrugated flexible tubular element made of stainless steel;
   b) a stainless steel core mesh positioned around said helical central corrugated flexible tubular element to provide a relatively flat surface, said mesh consisting of:
      i) a first layer of steel tape of one size; and
      ii) a second layer of steel tape having a different size from said first said one size of said first layer of steel tape, said second layer being positioned over said first layer;
   c) a layer of at least one copper tape positioned on top of said second layer of said core mesh;

d) a plurality of superconducting tapes layered over said at least one copper tape, forming a first group of a plurality of superconducting tape layers;

e) a second group of a plurality of superconducting tape layers, at least one layer of said second group positioned on top of said first group of plurality of superconducting tape layers and being wound in one direction opposite to that of (d); and wherein a pitch of the layers varies from a maximum $P_{max1}$ and $P_{max2}$ in intermediate layers to minimum $P_{min1}$ and $P_{min2}$ in inner and outer layers, while twist angles of the tapes in the layers vary from $\alpha_{max1}$ to $\alpha_{min1}$ and from $\alpha_{max2}$ to $\alpha_{min2}$ and at least one layer of tapes from normally conducting metal is located between the outer surface of the former and the inner surface of said layer, wherein:

a) for the inner layers:
   i) $P_{min1}$ and $\alpha_{max1}$ are defined as minimum pitch and maximum twist angle of said tapes in the first layer made of superconducting tapes from the cable axis:
   ii) $P_{max1}$ and $\alpha_{min1}$ are defined as maximum pitch and minimum twist angle of said tapes in the last layers made of superconducting tapes of the first group of layers adjacent to the central core and having one direction of lay; and b) for the outer layers:
   i) $P_{min2}$ and $\alpha_{max2}$ are defined as minimum pitch and maximum twist angle of tapes in the first layer made of superconducting tapes from the cable axis; and
   ii) $P_{max2}$ and $\alpha_{min2}$ are defined as maximum pitch and minimum twist angle of tapes in the last layers made of superconducting tapes of the second group of layers with opposite direction of lay.

2. The flexible superconducting core according to claim 1, wherein said flexible tubular corrugated element has an external diameter of preferably between 4 and 6cm, an internal diameter between 2 and 4 cm, a corrugation depth ranging between 0.5 cm and 1 cm, and a corrugation pitch between 0.8 and 1.5 cm.

3. The flexible superconducting core for claim 1, wherein the stainless steel tape for said first layer has a width ranging between 4 cm and 5 cm and a thickness between 0.005 to 0.006 cm and spacing ranging from 0.15 to 0.2 cm and the second layer of stainless steel tape is applied which has a width ranging from 2.5 to 4 cm and a thickness ranging from 0.001 to 0.002 cm with a spacing ranging from 0.1 to 0.15 cm.

4. The flexible superconducting core according to claim 1, wherein the at least one copper tape has a width ranging from 0.25 cm to 0.40 cm and a thickness ranging from 0.025 to 0.030 cm with a laying length ranging from 2 to 100 cm.

5. The flexible superconducting core according to claim 1, wherein said core operates with a current selected from the group consisting of direct current, alternate current, current pulses and combinations thereof.

6. The flexible superconducting core according to claim 1, wherein said tapes of copper are made from the group consisting of metals and alloys with low electric resistance based on a metal selected from the group consisting of aluminum, copper and silver.

7. The flexible superconducting core according to claim 1, wherein said superconducting tapes can be a shape selected from the group consisting of flat, round oval and a sector.

* * * * *